United States Patent [19]

Smith et al.

[11] Patent Number: 5,665,898
[45] Date of Patent: Sep. 9, 1997

[54] METHOD AND APPARATUS FOR TESTING SOLENOIDS IN A SAFETY SYSTEM BY BYPASSING THE SOLENOID OPERATED PILOT VALVE

[75] Inventors: Martin James Smith, Rancho Palos Verdes; Peter Yau-kwong Leung, Irvine; Richard Arthur Stanley, Tustin; Larry Lee Drake, Downey; Richard Thomas Mangan, La Habra Heights, all of Calif.

[73] Assignee: Atlantic Richfield Company, Los Angeles, Calif.

[21] Appl. No.: 174,972

[22] Filed: Dec. 29, 1993

[51] Int. Cl.⁶ .................................................. F16K 31/12
[52] U.S. Cl. .................... 73/1.72; 73/168; 251/30.01; 251/26
[58] Field of Search .................. 73/4 R, 168; 251/26, 251/30.01

[56] References Cited

U.S. PATENT DOCUMENTS

| | | | |
|---|---|---|---|
| 4,343,454 | 8/1982 | Kure-Jensen et al. | 251/26 |
| 4,896,101 | 1/1990 | Cobb | 324/73.1 |

Primary Examiner—Richard Chilcot
Assistant Examiner—Joseph L. Felber
Attorney, Agent, or Firm—Joseph E. Rogers

[57] ABSTRACT

A method and apparatus are disclosed for testing the operation of solenoids in a safety system by bypassing the solenoid operated pilot valve and applying a pneumatic control source to the system being tested through a bypass line while demonstrating the operation of the solenoid operated pilot valve for such a system using a test pressure source and a test input through the testing system. The system thereby permits continued operation of the process system while verifying proper operation of the safety system.

15 Claims, 3 Drawing Sheets

METHOD AND APPARATUS FOR TESTING SOLENOIDS IN A SAFETY SYSTEM BY BYPASSING THE SOLENOID OPERATED PILOT VALVE

BACKGROUND OF THE INVENTION

1. Field of the Invention

This invention relates to an apparatus and a method for testing the operation of solenoid valves. More particularly, it pertains to a method and an apparatus for testing solenoid valves in a safety system of a process plant.

2. Description of the Prior Art

Modern process plants contain innumerable operating components. These components are tied together to form systems controlled by instrumentation and control systems containing sensors and controllers. The instrumentation and control systems on such plants not only serve to control the functions of the various components in order to achieve the desired process conditions, but they also provide the facility to safely modify or discontinue the operation of all or a portion of the plant's systems in order to avoid an unsafe situation or condition.

Safety systems require routine testing in order to verify that they continue to properly perform the functions for which they were intended. From an operational and economic point of view, they also should not modify or discontinue the operation of the plant system unnecessarily. One of the means by which such safety systems function is by the securing or diverting of the supply of a certain process fluid or the supply of motive power to a plant system or component of a plant system.

One of the means by which these safety functions can be accomplished is through the use of pneumatically operated valves. Such valves are operated by pneumatic actuators connected through solenoid operated pilot valves to the pneumatic control source.

In operation, the pneumatic actuators of such safety system valves are isolated from the pneumatic control source and pressure in the operator is vented off when the solenoid on the pilot valve is repositioned (e.g. de-energized). The safety system valve then changes position and the plant system is placed in the configuration designated for safety.

In some cases, individual input bypasses to the control system could not be exercised in order to test the operation of the pilot valve without actually tripping the system during testing.

Thus, there exists a need for a testing method and an apparatus to test the operation of solenoids in solenoid operated pilot valves for safety systems that does not negate the effectiveness of the safety system during the test phase and further does not require the plant system to be shut down during testing such that testing can be performed more frequently.

SUMMARY OF THE INVENTION

In accordance with the present invention we have discovered an apparatus for testing solenoids in a safety system comprising a test pressure source containing a compressed gas; a first valve in fluid communication with the test pressure source; a pneumatically actuated valve having an actuator in fluid communication with the first valve; a bypass line in fluid communication with the first valve and a pneumatic supply source; a first solenoid operated valve in fluid communication with the first valve and having an inlet, an outlet and a vent; a second valve in fluid communication with the pneumatic supply source, the inlet to the first solenoid operated valve, the bypass line and a solenoid operated vent valve thereby permitting the testing of the first solenoid operated valve without operating the safety system valve.

Also, we have discovered a method for testing solenoids in a safety system while the control system continues to operate a system safety valve, comprising shifting control air supply input to a safety system valve operator from a solenoid operated valve to a bypass supply line; aligning an inlet of the solenoid operated valve to a test pressure source containing a compressed gas; actuating the solenoid of the solenoid operated valve to change the position of the solenoid operated valve to vent the compressed air in the test pressure source to atmosphere; monitoring the venting of the test pressure source through the solenoid operated valve to verify solenoid operation.

The apparatus and method described above solve the problems that exist in the prior art as well as providing the ability to more frequently test such systems to insure their day to day satisfactory operation. In addition, the system provides automatic remote indication of its test status as well as the inability to secure the enclosure for the test system while the system is actually in the test mode.

DESCRIPTION OF THE PREFERRED EMBODIMENT

Our invention can best be understood by referring to the above described figures in conjunction with the detailed description below. The same or similar identifying numbers or letters will be used throughout to refer to the same or similar elements in each of the figures.

Figure 1:
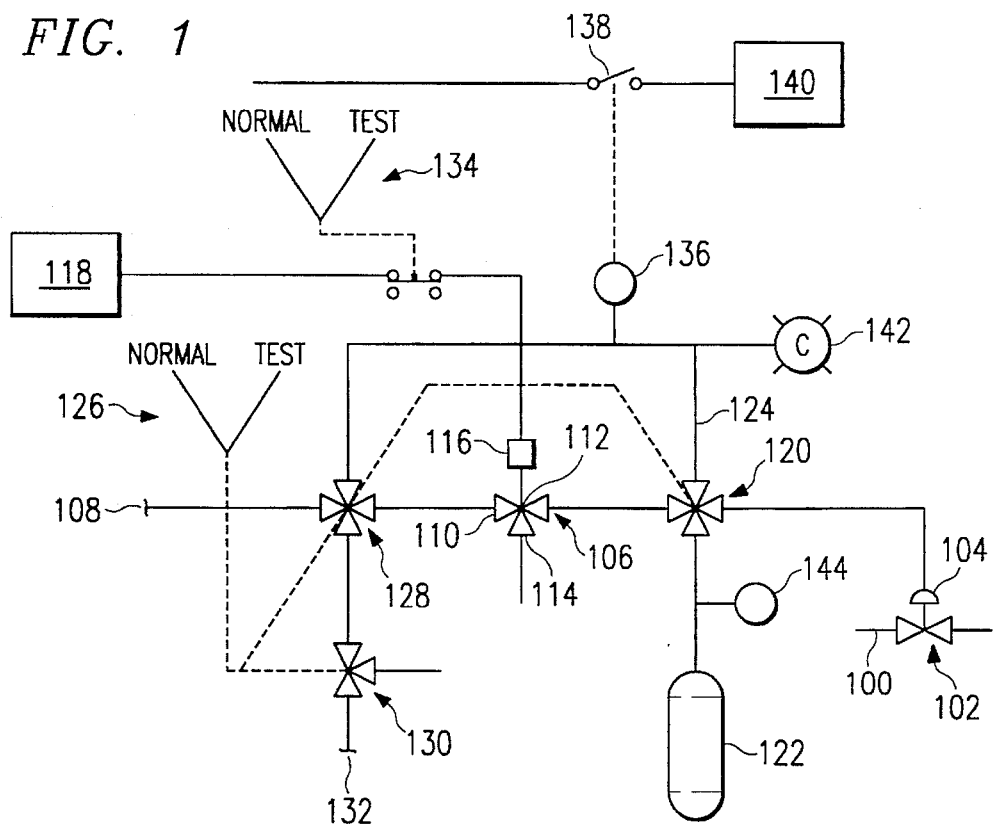
FIG. 1 is a logic diagram for an apparatus for testing solenoids in a safety system.

FIG. 1 is a logic diagram for an apparatus for testing solenoids in a safety system.

In FIG. 1, the motive source or process fluid to be controlled is contained in line 100 and pneumatical valve 102 provides isolation for safety purposes. Valve 102 that may be any one of number of different designs that is well known in the art is operated by a pneumatic operator 104 connected through a solenoid operated valve 106 to a pneumatic control source 108. Solenoid operated valve 106 has an inlet 110 and outlet 112 and a vent 114 and may be of any suitable type of which many are well known in the art.

Solenoid operated valve 106 is operated through solenoid 116 which receives a control air signal from safety system 118.

Test crossover valve 120 is connected to outlet 112 of the solenoid operated valve 106 and is between solenoid operated valve 106 and pneumatic operator 104. Test crossover valve 120 also connects test pressure source 122 and bypass line 124.

Test crossover valve 120 has two positions and is manually controlled by handle 126 schematically shown on FIG. 1. In the "normal" position, crossover valve 120 connects outlet 112 of solenoid operated valve 106 to pneumatic operator 104 and isolates bypass line 124 and test pressure source 122. In the "test" mode, crossover valve 120 in conjunction with test crossover valve 128 described below provides a pneumatic control source through bypass line 124 to pneumatic operator 104 and connects test pressure source 122 to outlet 112 of solenoid operated valve 106.

Handle 126 is also connected to crossover valve 128 which has two positions which are controlled by handle 126 schematically shown on FIG. 1. In "normal," crossover valve 128 connects a pneumatic control source 108 to the inlet 110 of solenoid operated valve 106. Pneumatic control source 108 can be a constant pressure source or be a modulated pressure source as might be provided by a pneumatic controller which controllers are well known to those skilled in the art. In the "normal" position, handle 126 causes valve 130 to vent the line between it and crossover valve 128. When handle 126 is in the "test" position, crossover valve 128 connects pneumatic control source 108 through bypass line 124, and crossover valve 120 to pneumatic operator 104. In addition, handle 126 connects inlet 110 to the valve 130 which is capable of directing compressed gas supply 132 to refill test pressure source 122 through crossover valve 128, solenoid operated valve 106, and crossover valve 120 when the handle 126 is in the "test" position.

Solenoid 116 is tested using a spring loaded switch 134 that is spring loaded to normal and disconnects the control input signal from the solenoid to permit de-energizing a solenoid and consequent test of its operation.

Also attached to bypass line 124 is a pressure sensing device 136 that senses pressure in bypass line 124 and controls a switch 138 by closing it to provide a signal to alarm 140 in a remote location, such as the control room of a process plant. The exact type of device or instrumentation and control system to be used may be any one of a number of systems that are well known in the art. Local indication of test system operation is also provided by a local alarm 142 that can be a pneumatically operated visual indicator or any other pressure/alarm or combination many of which are currently well known in the art. The actual operation of the solenoid operated pilot valve is monitored through observing the pressure on pressure indicator 144 that can be a mechanical gauge or any other device capable of providing pressure indication to the test system operator.

Figure 2:
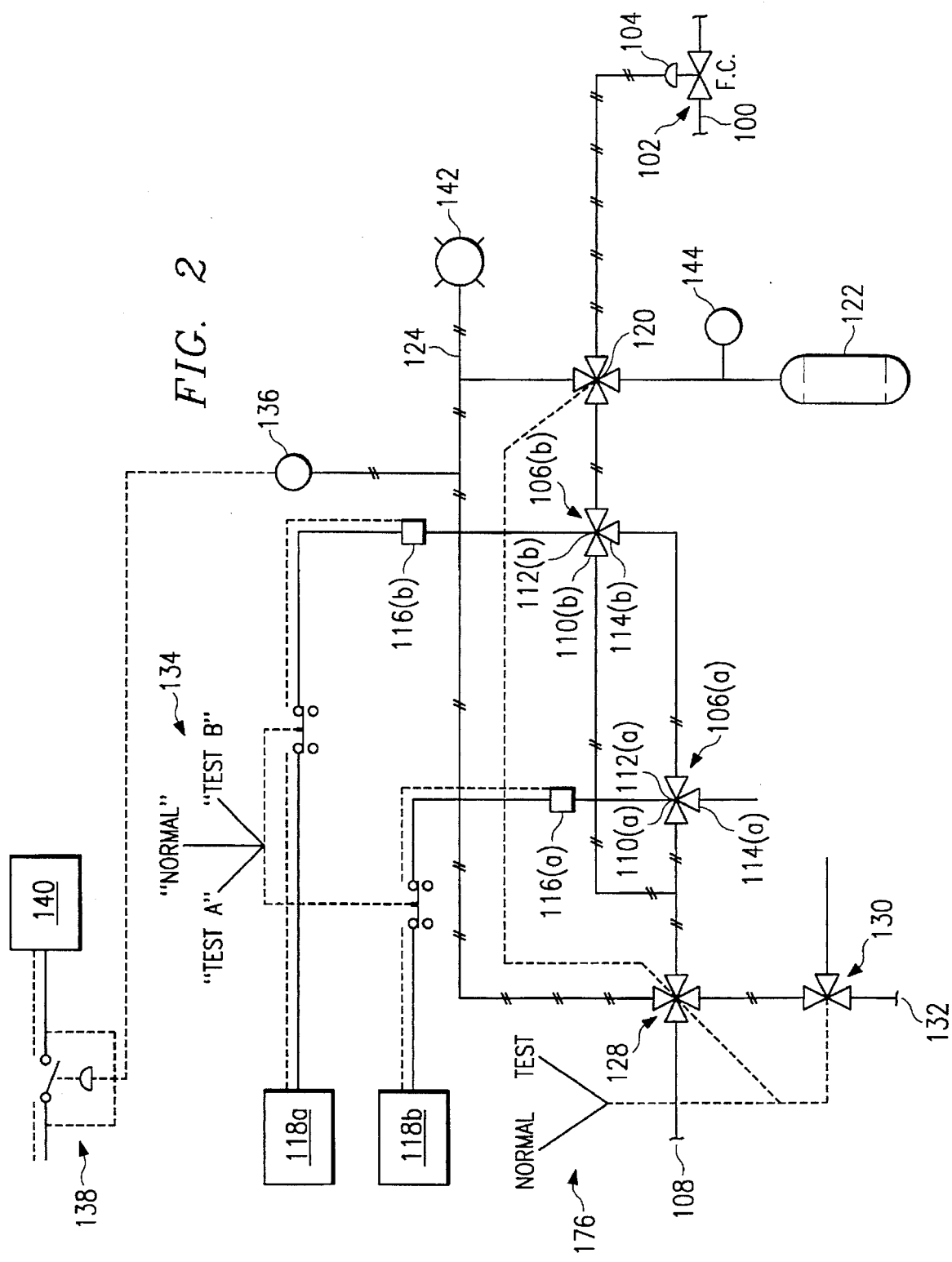
FIG. 2 shows a second embodiment of the apparatus in FIG. 1 and is a logic diagram for a similar apparatus for testing solenoids in a safety system for use in a system that contains redundancy.

FIG. 2 shows a second embodiment of the apparatus in FIG. 1 and is a logic diagram for a similar apparatus for testing solenoids in a safety system for use in a system that contains redundancy. In it, the safety system also employs a valve 102 and a pneumatic operator 104, but utilizes redundant solenoid operated valves 106(a) and 106(b) operated by solenoids 116(a) and 116(b) respectively. Solenoids 116(a) and 116(b) are controlled by control systems 118(a) and 118(b) respectively. Correspondingly, the test system provides a test switch 134 with three positions which is spring loaded to normal and a position "test A" to test the operation of solenoid 116(a) and a "test B" position to test the operation of solenoid 116(b).

Figure 3:
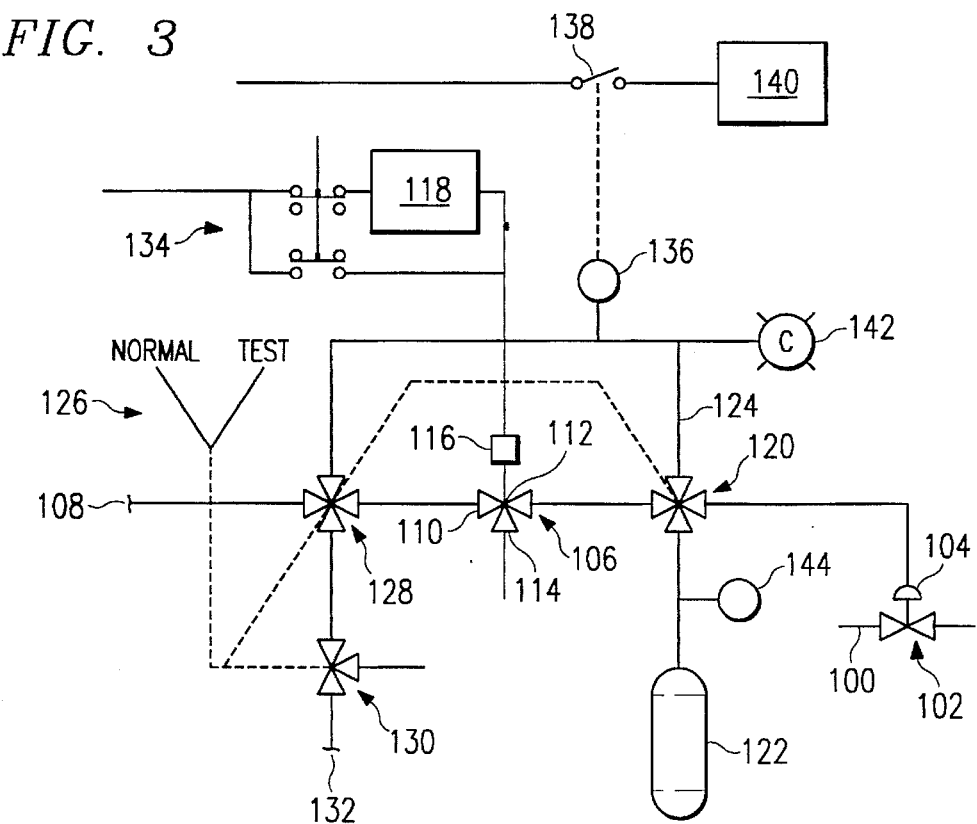
FIG. 3 is a logic diagram for an apparatus for testing solenoids in a safety system where the solenoid is energized to operate.

FIG. 3 is a logic diagram for an apparatus for testing solenoids in a safety system where the solenoid is energized to operate. It is identical to FIG. 1, except that in the normal operating condition, solenoid 116 is de-energized and it energizes to vent solenoid operated valve 106 and vent operator 104. In this test system, test switch 134 isolates the safety system 118 by opening the circuit at its input. Test switch 134 then provides a control signal to solenoid 116 that energizes solenoid 116 and vents operator 104.

Figure 4:
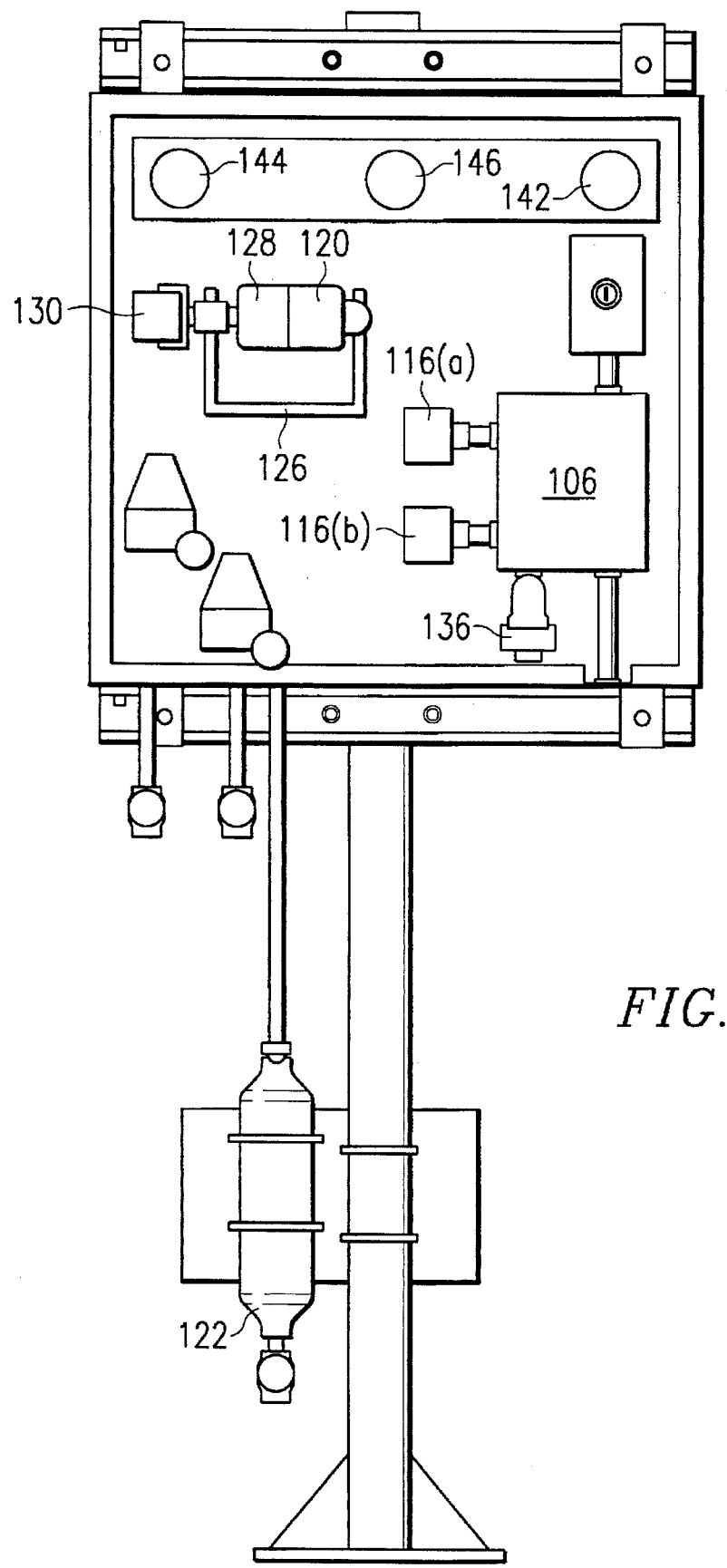
FIG. 4 is a cut away of the locally installed apparatus for testing solenoids in a safety system showing a location of components.

FIG. 4 shows a cutout for the arrangement of the components shown on logic diagram in FIG. 2. The apparatus shown on FIG. 4 includes a door (not shown) to protect the various components from the elements and from any process disturbances as well as providing security for unauthorized operation. The bypass panels are locked with key switches or padlocked. The door, however, cannot be closed and locked unless handle 126 is in the "normal" position as shown in FIG. 4. The "test" position of handle 126 would not permit the closure of the door.

In operation, again referring to FIG. 1, in the normal condition valve 102 could be, for example, in the open position as controlled by operator 104. Operator 104 control air is received from solenoid operated valve 106. Solenoid 116 controls the operation of solenoid operated valve 106 based upon signals received from the safety system 118. In normal operation, solenoid 116 in the example shown in FIG. 1 would be normally energized and valve 106 would be in the open position.

In the test configuration, the operator would arrive at this local test panel shown in FIG. 4 and after unlocking the test panel and unlocking the door (not shown) would rotate handle 126 to the test position. As described above, this changes the position of valves 130, 128, and 120 and ports the pneumatic control source 108 through bypass line 124 and isolates solenoid operated valve 106 from valve operator 104. It applies the pneumatic control source 108 from crossover valve 128 through bypass line 124 and crossover valve 120 to operator 104. When bypass line 124 is pressurized, the pressure is sensed and indicated by both a local alarm 142 and pressure switch 136 that changes the position of switch 138, thereby activating an alarm 146 in the control room of the plant, notifying the test operator and the plant operator that the particular safety system valve is in the "test" mode.

The operator can then test the operation of solenoid 106 valve by depressing test switch 134 thereby de-energizing solenoid 116 and causing the venting of test pressure source 122 through solenoid operated valve 106. The operator can monitor this depressurization through gauge 144 observing the proper operation of solenoid 116 and the solenoid operated valve 106. Upon verification of the proper operation and releasing of test switch 134, the signal from safety system 118 again energizes solenoid 116 opening the inlet 110 and the outlet 112 and shutting the vent 114 for solenoid operated valve 106. The operator can then return the handle 126 to the normal position, changing the positions of valves 130, crossover valve 128, and crossover 120 which will depressurize bypass line 124 changing the position of pressure switch 136 and switch 138 will de-energize the alarm in the control room. In addition, depressurizing bypass line 124 also shuts off local alarm 142. Return of handle 126 to the normal position also applies pneumatic control source 108 again to operator 104 for valve 102 through solenoid operated valve 106, thereby restoring the system to normal operation.

While this operation has been described in connection with the system shown in FIGS. 1 and 4, the operation would be analogous for a parallel system as shown in FIG. 2, the only difference being that there would be two solenoids to test through the operation of spring loaded switch 124. The configuration in FIG. 2 could also utilize the energize to trip concept shown in FIG. 3 and the test system and function would be analogous to FIG. 3.

While FIGS. 1 and 2 depict the operation of a solenoid test signal for safety systems for a system employing many different plant system configurations including but not limited to shutoff valves or even pneumatically operated systems used for isolation of electrical power. In addition, such systems may test solenoids for solenoid operated pilot valve one at a time or simultaneously.

Having thus described the invention by reference to certain of its preferred embodiments, it is respectfully pointed out that the embodiments described are illustrative rather than limiting, and that many variations and modifications are possibly within the scope of the present invention. Many such variations and modifications may appear obvious and desirable to those skilled in the art based upon the foregoing description of the preferred embodiments.

We claim:

1. An apparatus for testing a solenoid and its associated solenoid operated valve in a safety system, comprising:
   a. a test pressure source containing a compressed gas;
   b. a first valve in fluid communication with the test pressure source;
   c. a valve which substantially isolates a fluid source from a component having an operator in fluid communication with the first safety system valve;
   d. a bypass line in fluid communication with the first valve and a pneumatic supply source;
   e. a first solenoid operated valve in fluid communication with the first valve and having an inlet, an outlet, a vent and a solenoid;
   f. a second valve in fluid communication with the pneumatic supply source, the inlet of the first solenoid operated valve, the bypass line and a solenoid operated vent valve
   thereby permitting the testing of the first solenoid operated valve and its associated solenoid without operating the safety system valve.

2. The apparatus of claim 1 further comprising a pressure sensing device in fluid communication with the bypass line for providing an indication of the existence of pressure in the bypass line.

3. The apparatus of claim 2 further comprising an alarm in a remote location indicating the first solenoid valve is in the test mode.

4. The apparatus of claim 1 further comprising a handle mechanically connecting said first and second valves and having a normal and a test position.

5. The apparatus of claim 4 further comprising a door wherein said door is not closable with the handle in the test position.

6. The apparatus of claim 1 wherein the first solenoid operated valve is de-energized to vent.

7. The apparatus of claim 1 wherein the first solenoid operated is energized to vent.

8. The apparatus of claim 1 further comprising a plurality of solenoid operated valves.

9. A method for testing solenoids and associated solenoid operated valves in safety system while a control system continues to operate a safety system valve, comprising:
   a. shifting a pneumatic control source to a safety system valve operator from a solenoid operated valve to a bypass supply line;
   b. aligning an outlet of the solenoid operated valve to a test pressure source containing a compressed gas;
   c. actuating the solenoid of the solenoid operated valve to change the position of the solenoid operated valve to vent the compressed gas in the test pressure source to atmosphere;
   d. monitoring the venting of the test pressure source through the solenoid operated valve to verify solenoid operation.

10. The method of claim 9 further comprising the step of shifting the pneumatic control source to the safety system valve operator from the bypass line to the solenoid operated valve.

11. The method of claim 9 further comprising the steps of:
   a. sensing pressure in the bypass line supplying the pneumatic control source to the safety system valve operator; and
   b. providing an indication of the existence of pressure in the bypass line.

12. The method of claim 9 further comprising the step of alarming at a remote location to indicate the safety system valve is in a test mode.

13. The method of claim 9 wherein said step of actuating further comprises de-energizing a solenoid to operate the solenoid operated valve.

14. The method of claim 9 wherein said step of actuating further comprises energizing a solenoid to operate the solenoid operated valve.

15. The method of claim 9 wherein said actuating step further comprises actuating a plurality of solenoid operated pilot valves.

* * * * *